Dec. 21, 1965     D. H. SCHUSTER     3,225,209
TWO-LEVEL D.C./A.C. POWER CONVERTER OR AMPLITUDE MODULATOR
Filed Dec. 17, 1962
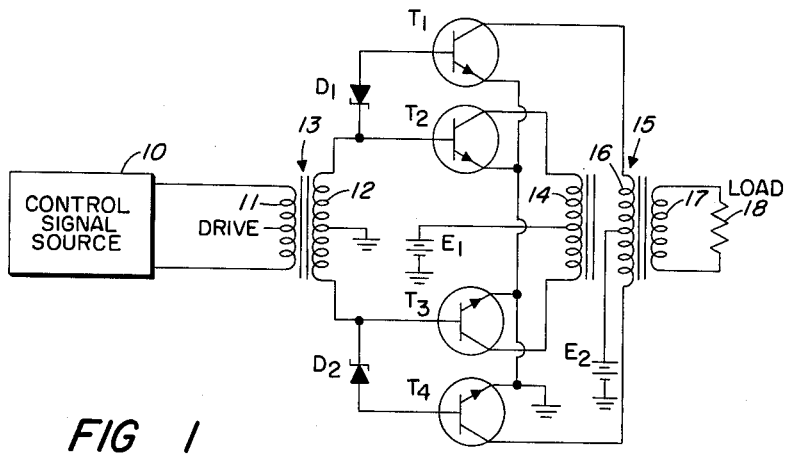
FIG 1
FIG 2
(a) 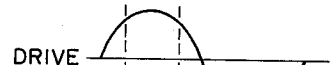
(b) 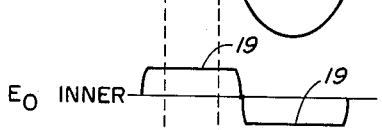
(c) 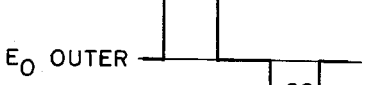
(d) 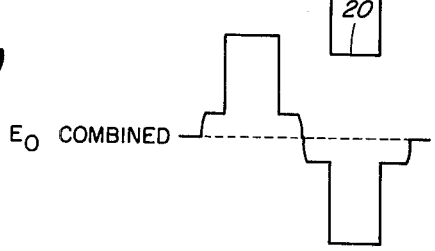
INVENTOR.
Donald H. Schuster
BY
Attorney

United States Patent Office 3,225,209
Patented Dec. 21, 1965

3,225,209
TWO-LEVEL D.C./A.C. POWER CONVERTER OR AMPLITUDE MODULATOR
Donald H. Schuster, Cedar Rapids, Iowa, assignor to Collins Radio Company, Cedar Rapids, Iowa, a corporation of Iowa
Filed Dec. 17, 1962, Ser. No. 245,057
5 Claims. (Cl. 307—80)

This invention relates in general to a power converter, and in particular to a means for converting D.C. to A.C.

It is oftentimes desirable to amplify a low-level signal. The present invention discloses a system wherein a low-power A.C. signal controls the output of D.C. sources to obtain an amplified A.C. output.

It is an object of this invention to provide a power converter which has improved switching mode efficiency. Another object of this invention is to provide a power converter in which power is supplied by separate D.C. sources in a manner such that power is shared between them.

Further objects, features, and advantages of this invention will become apparent from the following description and claims when read in view of the drawings in which:

FIGURE 1 is a schematic drawing of the D.C. to A.C. power converter of the invention, and;

FIGURES 2a–2d illustrate wave shapes at various points in the circuit.

With reference to FIGURE 1, a control signal source 10 produces an A.C. output signal which is to be amplified. The shape of this signal could be as shown in FIGURE 2a. This signal might be, for example, the output of an accelerometer or other signal source. The output of the control signal source is connected to the primary 11 of a transformer 13. The secondary 12 of transformer 13 has its midpoint connected to ground.

One end of the secondary 12 is connected to the base of a transistor $T_2$. The other end of the secondary 12 is connected to the base of a transistor $T_3$. The collectors of transistors $T_2$ and $T_3$ are connected to opposite ends of a primary winding 14 of a transformer 15. The midpoint of primary winding 14 is connected to a D.C. power source $E_1$. The other side of the power source $E_1$ is connected to ground.

A Zener diode $D_1$ is connected to the base of transistor $T_2$, and has its opposite side connected to the base of a transistor $T_1$. A Zener diode $D_2$ is connected to the base of a transistor $T_3$ and has its opposite side connected to the base of transistor $T_4$. The collectors of transistors $T_1$ and $T_4$ are connected to opposite ends of a second primary winding 16 of transformer 15. The midpoint of second primary winding 16 is connected to a second D.C. power source $E_2$ which has its opposite side connected to ground. The emitters of transistors $T_1$, $T_2$, $T_3$, and $T_4$ are connected to ground.

A secondary winding 17 of transformer 15 is connected to a suitable load 18. The load 18, for example, might be an indicator, or any suitable apparatus that is to be driven by the amplified control signal.

In operation, as the A.C. signal produced by the control signal source varies, the transistors $T_2$ and $T_3$ will conduct on the negative and positive half cycles, respectively, at a first voltage level determined by the bias voltage $E_1$. This is indicated by the level 19 in FIGURE 2b. As the drive voltage increases in amplitude above this first conduction level, the Zener diodes $D_1$ and $D_2$ will conduct on negative and positive half signals, respectively. Transistors $T_1$ and $T_4$ will then conduct and supply inputs to the second primary 16 of the transformer 15. This point of conduction occurs at levels 20 in FIGURE 2c. Thus, the signal across the secondary 17 will be the sum of the signals 2b and 2c as shown in FIGURE 2d.

The low level A.C. signal is amplified with power being supplied by the D.C. sources $E_1$ and $E_2$. $E_2$ should be greater than $E_1$ to permit power sharing between the power sources.

It is seen that this invention provides an improved D.C. to A.C. power converter or amplitude modulator, and although it has been described with respect to a preferred embodiment it is not to be so limited as changes in modification may be made at or within the full intended scope as defined by the appended claims.

I claim:

1. A D.C. to A.C. power converter comprising a first transformer having a primary and a secondary, a control signal supplied to the primary of the first transformer, a first pair of transistors connected to opposite ends of the secondary of the first transformer, a second transformer having a first primary winding connected across the outputs of the first transistors, a pair of Zener diodes, a second pair of transistors connected in series with the Zener diodes, a second primary winding of the second transformer with opposite ends connected to the outputs of the second pair of transistors, the opposite ends of the secondary of the first transformer connected to the Zener diodes, and an output winding connected to the second transformer and supplying an output signal.

2. In apparatus according to claim 1, a first D.C. power supply connected to the first primary winding of the second transformer, and a second D.C. power supply connected to the second primary winding of the second transformer.

3. A D.C. to A.C. power converter comprising a first transformer, a control signal supplied to the primary of the first transformer, a first pair of gating means connected to opposite ends of the secondary of the first transformer, a second pair of gating means, a pair of Zener diodes connected between the second pair of gating means and the opposite ends of the secondary of the first transformer, a second transformer having a first primary winding connected across the outputs of the first gating means, a secondary primary winding of the second transformer connected across the outputs of the second pair of gating means, and an output winding connected to the second transformer to supply an output signal.

4. In apparatus according to claim 3, a first D.C. power supply connected to the first primary winding of the second transformer, and a second D.C. power supply connected to the second primary of the second transformer.

5. A D.C. to A.C. power converter comprising a first transformer, a control signal supplied to the primary of the first transformer, a first pair of transistors connected to opposite ends of the secondary of the first transformer, a second pair of transistors, a pair of Zener diodes connected between the second pair of transistors and opposite ends of the secondary of the first transformer, a second transformer having a first primary winding connected across the outputs of the first transistors, a second primary winding of the second transformer with opposite ends connected across the outputs of the second pair of transistors, an output winding connected to the second transformer to supply an output signal, the inputs to the first and second pair of transistors being supplied to their bases, the first and second primary windings of the second transformer being connected across the collectors of said transistors, and the emitters of the transistors connected together.

References Cited by the Examiner

UNITED STATES PATENTS

| | | | |
|---|---|---|---|
| 1,705,993 | 3/1929 | Oswald | 307—82 |
| 2,547,162 | 4/1951 | Kidd | 321—27 |
| 2,785,236 | 3/1957 | Bight et al. | 330—15 |
| 3,096,486 | 7/1963 | Atherton | 330—15 |

LLOYD McCOLLUM, *Primary Examiner.*

L. R. CASSETT, T. J. MADDEN, *Assistant Examiners.*